Dec. 18, 1956 C. H. LATIMER-NEEDHAM ET AL 2,774,547
REEL
Filed April 1, 1952 3 Sheets-Sheet 1
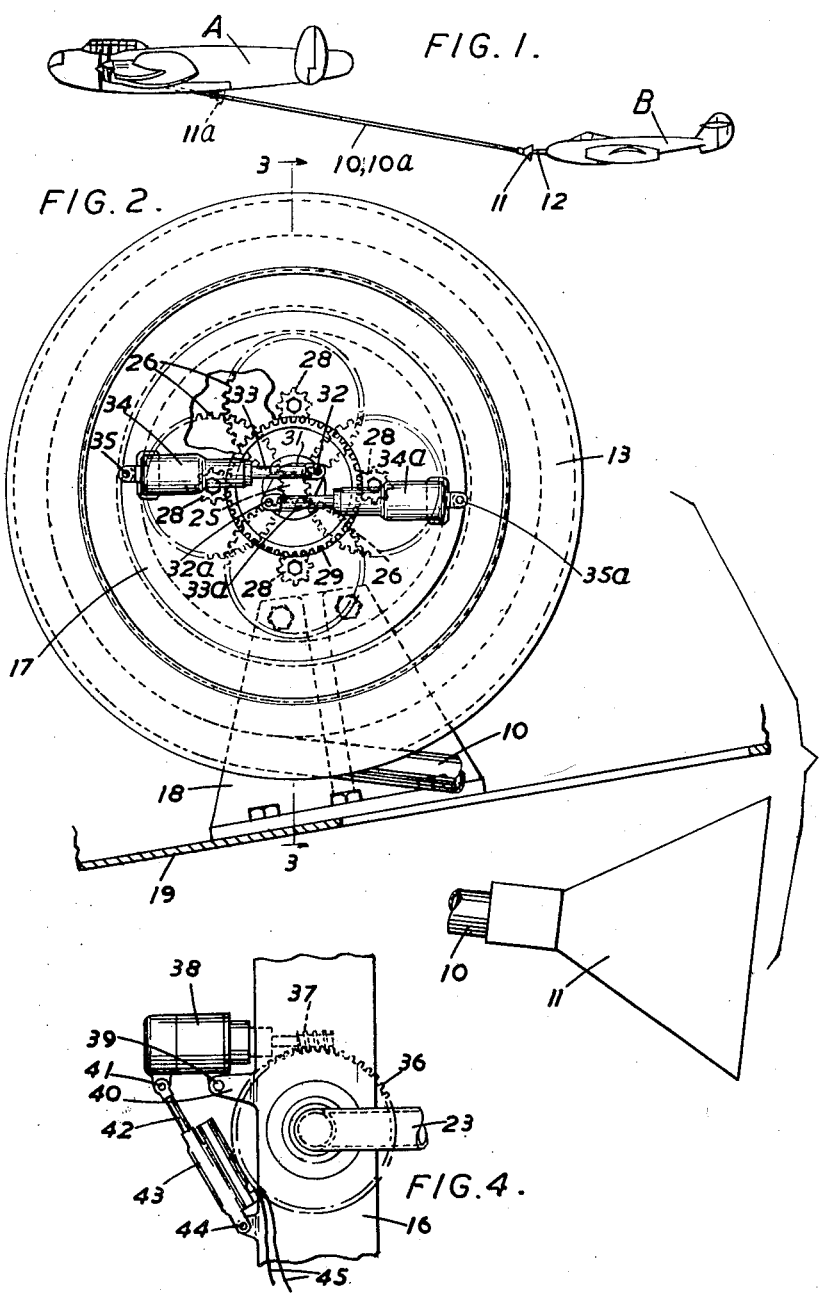
Inventors
C. H. Latimer-Needham
P. F. Worlidge
By Watson, Cole, Grindle & Watson
Attorneys Dec. 18, 1956   C. H. LATIMER-NEEDHAM ET AL   2,774,547
REEL
Filed April 1, 1952   3 Sheets-Sheet 2
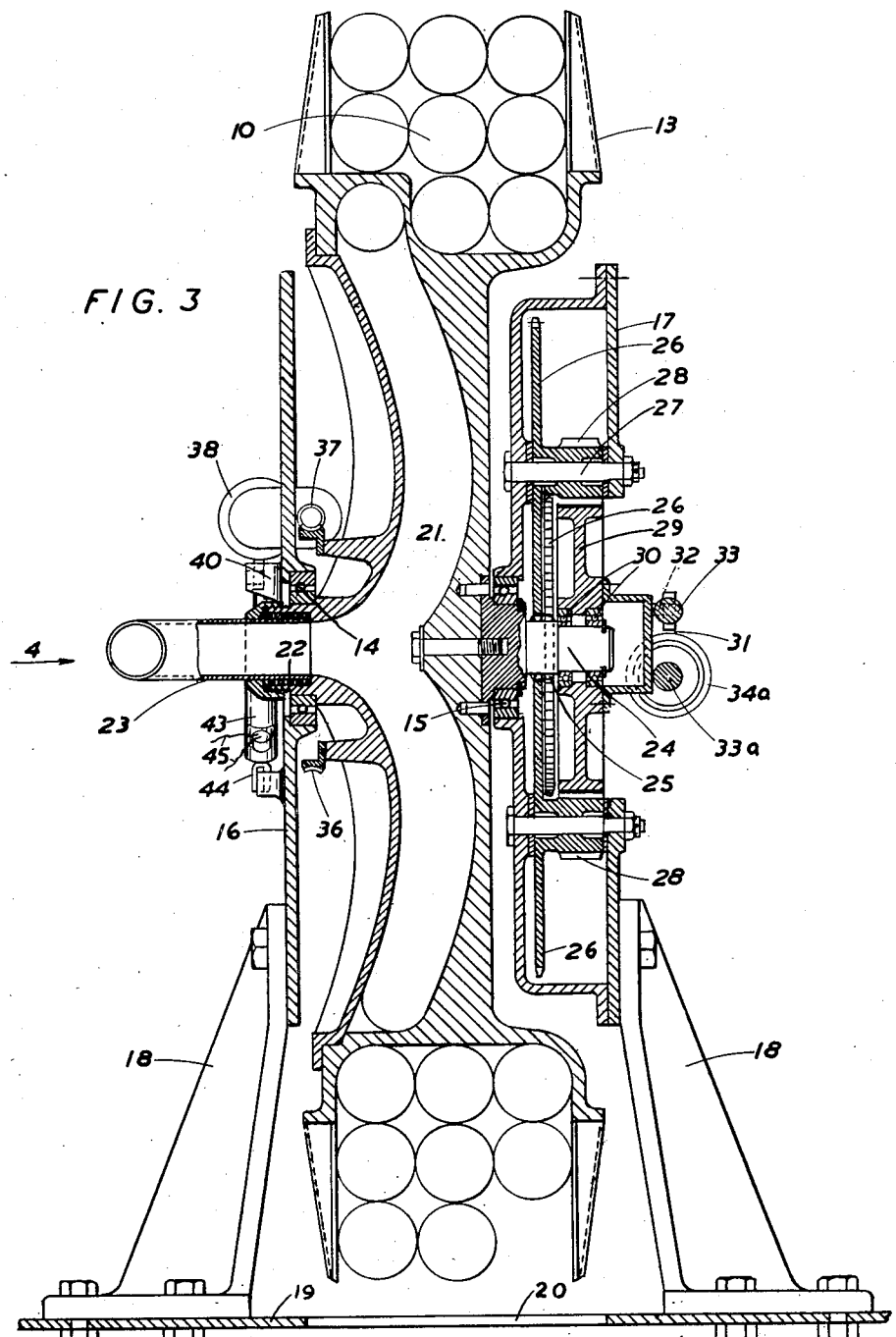

Dec. 18, 1956  C. H. LATIMER-NEEDHAM ET AL  2,774,547
REEL
Filed April 1, 1952  3 Sheets-Sheet 3

United States Patent Office 2,774,547
Patented Dec. 18, 1956

2,774,547

REEL

Cecil Hugh Latimer-Needham, Broadstone, and Ronald F. Worlidge, Lower Parkstone, England, assignors to Flight Refuelling Limited, London, England, a British company Application April 1, 1952, Serial No. 279,775

Claims priority, application Great Britain April 3, 1951

3 Claims. (Cl. 242—86)

This invention relates to hose or cable reels, and more particularly to resiliently controlled reels especially adapted for use in hauling in or paying out extensible connecting members used in towing and/or refuelling of aircraft in flight, as for example, in pursuing the system described in the copending application Ser. No. 153,198, filed March 31, 1950, now Patent 2,692,102, issued October 19, 1954.

According to this invention (which is concerned solely with the apparatus borne by the tug or leading aircraft) the apparatus includes resilient means operative to transmit to the aircraft the load sustained by the inboard end of the connecting member in such a way that the rearward extension from the aircraft of the trailing end of the connecting member varies progressively with said transmitted load, the resilient means being constituted by a so-called liquid spring, whose resilience is provided by elastic volumetric compression of a liquid.

The apparatus preferably includes mechanism for multiplying the displacements of the movable member of the liquid spring by a large factor so that large changes of extension of the twing connection or/and refuelling pipe correspond to small displacements of the movable member of the liquid spring.

The advantage of combining resilient means with the mounting of a trailed refuelling pipe is fully discussed in co-pending patent application Serial No. 279,774, filed April 1, 1952, to which reference is made; while in combination with a towing member as such, the resilient means serves as a cushion or shock-absorber and will prevent or at least minimize snatching and whipping of the tow in turbulent air conditions. In either case, for the resilient means to be effective the variation of extension of the connecting member between the limits corrsponding to the maximum and minimum loadings of the resilient means must be relatively large, i. e. of the order of several feet at least. This has two consequences (i) the amount of energy to be stored by the resilient means is in general large, and (ii) a high gear-ratio between the resilient means and the tow-line or refuelling pipe is required if the resilient means is to be kept reasonably compact, with the further consequence that the maximum force to which the resilient means is subjective is correspondingly high.

It is believed that in these respects the liquid spring offers outstanding advantages, since it has a very high energy-storage capacity and can develop very high forces for its bulk and weight. Furthermore, it is not subject to the explosion and fire risks inseparable from a pneumatic spring operating at the very high pressures that would be required to give the pneumatic spring a comparable performance.

The accompanying drawings illustrate by way of example only an embodiment of the invention. In the drawings, Figure 1 is a schematic representation in side elevation of two aircraft when carrying out a refuelling or towing operation with the apparatus according to the invention;

Figure 2 is a side elevation of a reel mounted in the leading aircraft of Figure 1 and carrying a trailable hose-pipe;

Figure 3 is a section on the line 3—3 of Figure 2;

Figure 4 is a detail view in side elevation as viewed in the direction of arrow 4 of Figure 3.

Figure 5:
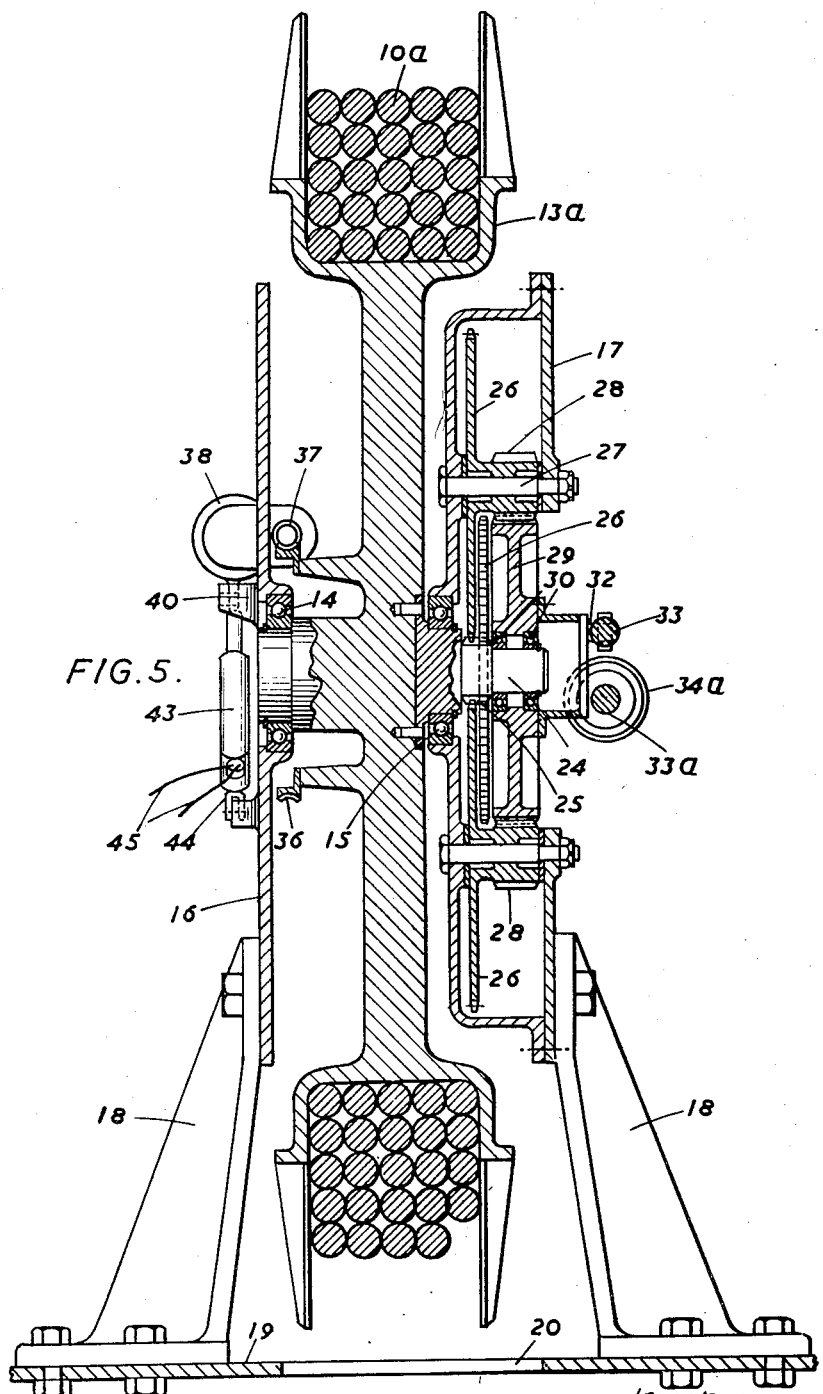
Figure 5 is a view similar to Figure 3 illustrating a modified reel carrying a towing cable.

Referring to Figure 1, the leading aircraft A trails an extensible connecting member constituted by a flexible hose 10 or towing cable 10a carrying a terminal funnel-shaped drogue 11 within which is arranged the socket of a plug and socket coupling with its axis aligned with the hose member. The plug member of the coupling is mounted, with its axis in the line of flight, on the end of a rigid member or "probe" 12 extending forwardly from the following aircraft B.

The coupling members are not illustrated since they may be of the kind fully described and illustrated in the said copending application Ser. No. 153,198, and this invention is not concerned with the details of the coupling members.

The hose 10 or cable 10a is mounted on a reel 13 or 13a (see Figures 2 and 3 and Figure 5) for paying it out and winding it in.

Referring to Figures 2 to 4, the reel 13 carrying a refuelling hose 10 is rotatably supported in bearings 14, 15 respectively carried by a mounting plate 16 and a gear-housing 17. The mounting plate and gear housing are rigidly supported by the aircraft structure in any suitable manner. For completeness, the mounting means are here schematically represented by pedestals 18 which are here shown merely for convenience as being secured to the outer skin 19 of the aircraft, although in practice they would usually be firmly attached to a strong rigid structural member. The aircraft skin 19 is provided with a slot 20 through which the hose 10 extends.

The end of hose 10 attached to the reel communicates with an internal cavity 21 formed in the reel; and this cavity communicates by way of a rotary gland 22, coaxial with the reel, with a fixed pipe 23 connected to the fuel storage tanks of the aircraft.

The other end of the reel is prolonged by a stub axle 24 supported by the bearing 15. Stub axle 24 extends into the gear-housing 17 and has a small spur gear 25 integrally formed on it. Gear 25 meshes with four larger planetary gears 26 rotatably supported on axles 27 mounted in the gear-housing. Gears 26 overlap in pairs, as shown in Figures 2 and 3. Each gear 26 is integral with a smaller gear 28, and gears 28 all mesh with a single larger gear 29 supported coaxially on the stub axle 24 by bearings 30. Gear 29 carries a crank plate 31 having two crank pins 32, 32a, disposed at 180°, to which the plungers 33, 33a of two liquid springs 34, 34a are respectively attached in a pivotal manner. The bodies of the springs 34, 34a are pivotally anchored at 35, 35a to the outer face of the gear-housing 17, which constitutes a rigid fixed abutment for the liquid springs.

These liquid springs are known articles of commerce and it is therefore considered unnecessary to describe or illustrate their internal details. They operate by volumetric compression of a liquid confined inside their bodies, by inward movement of their plungers. In the present combination they act as compression springs disposed between the crank pins 32, 32a and the abutment anchorages 35, 35a.

On the end of the reel 13 opposite to the gear-housing is mounted a worm-wheel 36 with which a worm 37 meshes. Worm 37 is mounted on the output shaft of a motor 38. Motor 38 is pivotally supported at 39 on a bracket 40 fixed to the mounting plate 16 (see also Figure 4). An electrical actuator 43, in the form of a jack, the control leads of which are indicated at 45, is pivotally anchored at 44 on the mounting plate 16 and its movable member 42 is pivotally connected at 41 to the motor 38. This actuator can be operated to rock the motor 38 on its pivotal mounting 39 so as to mesh and unmesh the worm 37 with and from the worm-wheel 36.

In Figures 2 and 3 the hose is shown fully reeled in on reel 13 and in this position the liquid springs 34, 34a are fully extended and unloaded. When the hose is allowed to pay out under the drag of the drogue 11, the reel rotates counterclockwise (as seen in Figure 2) and this rotation is transmitted, in the same sense, but with a very large factor of motion-reduction, by the gearing 25, 26, 28, 29 to the crank plate 31 so as to compress and load up the liquid springs 34, 34a, which become loaded to their maximum extent when the hose is fully extended.

It will be seen that the tension in the hose increases progressively as it pays out and as the liquid springs become more and more compressed. The relationship between the extension of the hose and the loading of the liquid springs is not in general linear owing to the variation in the effective radius of the hose on the reel as the hose is payed out (in the example illustrated the turns of the hose are arranged in three layers on the reel when it is fully wound up), and also owing to variation of the effective leverage of the crank plate 31 on the springs 34, 34a as the crank angle varies. This departure from linearity can, by suitable design as regards dimensions, gear ratios and crank angles, be kept within limits such that no practical inconvenience is caused. The net effect will usually be to give a somewhat higher spring rate, i. e. a greater increment of spring loading for a given increment of hose extension, as the extension of the hose increases, and this may even be beneficial.

The hose can be payed out under the combined drag of the drogue and of the hose itself, until the loading of the liquid springs balances this combined drag force. The motor 38 may be disconnected from the reel by unmeshing the worm gear 36, 37, during this process, but it may be desirable to leave the motor connected to control the rate of paying out, since the motor will act as a brake if caused to overrun.

If the drag of the drogue plus the drag of the hose itself is insufficient to load up the liquid springs to their maximum load capacity the hose cannot be payed out fully under the drag of the drogue and hose alone, but only after connection with a following aircraft, by imposing a towing load as hereinafter mentioned. For reeling in the hose the motor will be engaged and used.

In the example illustrated the liquid springs begin to be loaded-up as soon as the hose begins to pay out, but the construction could be modified by mounting the crank plate 31 on the gear 29 with a certain degree of lost motion, such that the gear 29 would not pick-up the crank plate and start rotating it until it (gear 29) had rotated through a certain angle, corresponding to a pay-out of a given length of hose, from the initial position in which the hose is fully reeled up.

In the modification illustrated in Figure 5, the hose 10 is replaced by a towing cable 10a and the hose reel 13 by a cable reel 13a, the fixed pipe 23 and its connections 22, 21, with the hose being omitted. In other respects the mechanism illustrated in Figure 5 is similar to that illustrated in Figure 3, the same reference characters being used to distinguish corresponding parts.

In carrying out a refuelling operation with the apparatus illustrated in Figures 2 to 4, the hose is payed out by the leading aircraft A (Figure 1) from the retracted position (see Figure 1 in which the retracted position of the drogue 11 is shown at 11a) under the drag of the drogue until the drag of the drogue and hose is just balanced by the loading of springs 34, 34a. The following aircraft B (Figure 1) approaches from behind and inserts its probe 12 into the drogue 11, which serves to guide the plug member of the coupling on the extremity of the probe 12 into the complementary socket member inside the drogue.

The subsequent procedure for normal refuelling without towing is fully described in the complete specification of United States application Serial No. 279,774, filed April 1, 1952 and consequently need not be repeated here. During the refuelling operation, as described in United States application Serial No. 279,774, filed April 1, 1952 and carried out at constant throttle-settings of both aircraft, the following aircraft B changes station with respect to the leading aircraft A, its initial and final positions corresponding to a high and a low loading of the liquid springs 34, 34a respectively, or conversely. To avoid undue tensile loading of the coupling at any stage of the process, it is desirable that the drag of the dogue 11, should be great enough to extend the hose 10 fully, or nearly so, against the effort of springs 34, 34a, as explained in the complete specification of application Serial No. 279,774, filed April 1, 1952.

If the apparatus is to be used for towing, with or without refuelling, the drogue 11 can be dispensed with or its drag much reduced, since it is only necessary to provide the combined refuelling and towing hose (Figure 3) or the towing cable (Figure 5) with enough drag to extend it to the minimum working length and furnish at that extension enough resistance to the following aircraft to ensure engagement of the coupling. Connection will then be made by the following aircraft in that position and on cutting the motor(s) of the following aircraft, the latter will fall back and extend the hose 10 or cable 10a until the full towing load is taken by springs 34, 34a. The full towing load must be well within the maximum load limit of these springs to allow them to function as cushioning devices or shock absorbers during the tow.

We claim:

1. For use in resisting the unwinding of a reel, such as a reel upon which a trailing connection between two aircraft is wound, the sub-combination which comprises a frame secured upon one of the aircraft, the reel, a shaft rotatably carried by said frame and upon which the reel is fixed, a pinion fixed upon said shaft, a plurality of lay shafts on said frame and disposed about said reel shaft, a pair of rigidly connected gears on each lay shaft one gear of each pair being considerably larger than the other, a crank element, the larger gear of each pair being in mesh with said reel shaft pinion, a gear rotatably carried by said frame substantially concentrically with said reel shaft and rigidly connected with said crank element at its center of rotation, at least one extensible and contractable liquid spring member having one end fixed to said frame and the other end operatively connected with said crank element, the resistance of said liquid spring member being provided by elastic volumetric compression of a liquid between its fixed and movable ends.

2. The sub-combination as set forth in claim 1 in which a motor is pivotally carried by said frame and has a shaft having a worm fixed thereon, a worm wheel carried by said reel, and means for swinging said motor about its pivot to engage said worm with and disconnect it from said worm wheel at will, whereby said reel may be rotated to wind in said extensible connecting member, or the reel may be freed completely from engagement with the motor.

3. For use in resisting the unwinding of a reel, such as a reel upon which a trailing connection between two aircraft is wound, the sub-combination which comprises a frame secured upon one of the aircraft, the reel, a shaft rotatably carried by said frame and upon which the reel is fixed, a pinion fixed upon said shaft, a crank element pivotally mounted on said frame, a train of two-stage speed-reduction gearing carried by said frame and operatively connected with said pinion and said crank to transmit movement from said pinion to said crank element, at least one extensible and contractable liquid spring member having one end fixed to said frame and the other end operatively connected with said crank element, the resistance of said liquid spring member being provided by elastic volumetric compression of a liquid between its fixed and movable ends, a motor carried by said frame, gear means operatively connected between said motor and said reel to transmit motion at reduced speed from the motor to the reel in the direction for winding in said extensible connecting member, and controllable means for disconnecting said motor from the reel to enable said extensible member to be payed out freely.

References Cited in the file of this patent

UNITED STATES PATENTS

| | | |
|---|---|---|
| 1,848,372 | Moran | Mar. 8, 1932 |
| 1,948,158 | Barr | Feb. 20, 1934 |
| 2,130,504 | McClane | Sept. 20, 1938 |
| 2,279,156 | Barks et al. | Apr. 7, 1942 |
| 2,301,208 | Gear | Nov. 10, 1942 |
| 2,388,013 | Rasor | Oct. 30, 1945 |
| 2,499,909 | Fox | Mar. 7, 1950 |
| 2,582,609 | Steele | Jan. 15, 1952 |
| 2,596,455 | Williams | May 13, 1952 |

FOREIGN PATENTS

| | | |
|---|---|---|
| 561,851 | Great Britain | June 7, 1944 |